United States Patent [19]

Markusch et al.

[11] Patent Number: 5,607,998
[45] Date of Patent: Mar. 4, 1997

[54] PROCESS FOR THE REPAIR OF PLASTIC PARTS USING NON-SAGGING, SANDABLE POLYURETHANE COMPOSITIONS

[75] Inventors: Peter H. Markusch, McMurray; Jack W. Hausser, Bethel Park; Rick V. Starcher, Monaca, all of Pa.

[73] Assignee: Bayer Corporation, Pittsburgh, Pa.

[21] Appl. No.: 568,918

[22] Filed: Dec. 7, 1995

Related U.S. Application Data

[63] Continuation-in-part of Ser. No. 338,989, Nov. 14, 1994, abandoned.

[51] Int. Cl.$^6$ ............... B31B 1/60; B32B 31/00; C09J 4/00; C09J 101/00
[52] U.S. Cl. ............... 524/494; 156/60; 156/327; 156/330.9; 156/331.1; 156/331.4
[58] Field of Search ............... 156/60, 327, 330.9, 156/331.4, 331.1; 524/494

[56] References Cited

U.S. PATENT DOCUMENTS

| | | | |
|---|---|---|---|
| 4,943,603 | 7/1990 | Martinez | 523/220 |
| 5,204,439 | 4/1993 | Dormish et al. | 528/44 |

*Primary Examiner*—Paul R. Michl
*Assistant Examiner*—Patrick Niland
*Attorney, Agent, or Firm*—Joseph C. Gil; N. Denise Brown

[57] ABSTRACT

The present invention relates to a process for repairing plastic parts with non-sagging, sandable polyurethane compositions. These compositions are prepared by mixing A) a liquid polyisocyanate having an isocyanate content of from about 10 to 50% by weight; B) a liquid isocyanate-reactive mixture comprising: i) one or more high molecular weight, hydroxyl group containing compounds, ii) one or more organic compounds containing amine groups, and iii) of one or more low molecular weight diols or triols; and C) an inorganic filler mixture consisting of: 1) of glass flakes, and 2) of another inorganic filler. Components A) and B) are present in quantities such that the isocyanate index is from 90 to 120. Component C) is dispersed phase-stable in either or both component A) and/or component B) prior to mixing components A) and B).

7 Claims, No Drawings

PROCESS FOR THE REPAIR OF PLASTIC PARTS USING NON-SAGGING, SANDABLE POLYURETHANE COMPOSITIONS

CROSS-REFERENCE TO RELATED APPLICATIONS

The present application is a continuation-in-part of application Ser. No. 08/338,989 filed on Nov. 14, 1994, now abandoned.

BACKGROUND OF THE INVENTION

This invention relates to a process for the repair of plastic parts using non-sagging, sandable polyurethane compositions. These compositions comprise the reaction product of a liquid polyisocyanate component, a liquid isocyanate-reactive mixture, and an inorganic filler mixture.

Various non-sagging polyurethane compositions are known in the art and described in, for example, in U.S. Pat. Nos. 4,444,976, 4,552,934, 4,698,408, 4,728,710, 4,743,672, 4,954,199, 4,994,540, 5,059,672, 5,164,473, and 5,166,303. Most of these patents disclose two-component polyurethanes basically consisting of a polyisocyanate or polyisocyanate prepolymer component, and a curative component which may be a polyol, polyamine, etc.

Adhesives and/or sealants are disclosed in, for example, U.S. Pat. Nos. 4,336,298, 4,444,976, 4,552,934, 4,698,408, 4,743,672, 4,954,199, 4,994,540, and 5,164,473. These adhesive compositions are also mostly polyurethanes.

Sag-resistant, urethane adhesives which exhibit anti-foaming properties are disclosed in, for example, U.S. Pat. No. 4,728,710. The polyurethane consists of a polyisocyanate prepolymer as the base component, and a mixture of polyols and primary/secondary aliphatic or aromatic di- or polyamines as the curative component. Various fillers, including talc, are disclosed by this patent.

Expandable non-sagging polyurethane compositions are described in, for example, U.S. Pat. No. 5,166,303. These compositions are prepared by mixing a liquid polyisocyanate with a hydroxyl group containing compound, a low molecular weight diol or triol, an organic di- or polyamine, and a small amount of water. The volume increase of the composition varies with the quantity of water in the formulation. These compositions are disclosed as suitable for the repair of irregular shaped surfaces, and cracks and voids. It is further disclosed that glass fillers can be included in applications where sanding may be necessary.

The two-component adhesives disclosed in U.S. Pat. No. 4,336,298 consist of a base component and a hardener component, and are described as being suitable for bonding fiberglass reinforced polyester (FRP) panels together. Fillers are normally added to the base component (i.e. isocyanate) to assist in controlling the viscosity. The hardener component consists of a polyester or polyether triol, a diamine, and a tin catalyst.

U.S. Pat. No. 4,444,976 also discloses sag-resistant adhesive two-component compositions. These compositions require an isocyanate prepolymer, and a low molecular weight polyol containing at least 2–5 hydroxyl groups and a secondary diamine having a molecular weight of up to about 325. This particular composition is described as having non-sagging characteristics without the use of large quantities of fillers.

The sag-resistant two-component adhesive compounds of U.S. Pat. No. 4,552,934 consist of a prepolymer component and a curative component. A mixture of a low equivalent weight active hydrogen containing material that is partially reacted with an organic polyisocyanate, and a diamine or polyamine are suitable for the curative component. The use of fillers is broadly disclosed.

U.S. Pat. No. 4,698,408 describes sag-resistant, two-component urethane adhesives having improved thermal stability. The base component is a isocyanate prepolymer and a polyepoxide resin, and the curative component is a mixture of a polyol, a di- or tri- primary or secondary amine group containing compound and various catalysts. Fillers may be included in the base component.

The sag-resistance two-component adhesive urethanes of U.S. Pat. No. 4,743,672 exhibit properties such as excellent tack and peel strength during the working time of the adhesive. These urethanes consist of a isocyanate prepolymer, and a mixture of polyols, poly(alkylene oxide) polyamines, catalysts, and optionally a bicyclic amide acetal. Talc is among the various fillers disclosed which may be added to the curative component.

Adhesive compositions suitable for the bonding of fiber-reinforced plastic materials, including SMC (sheet molding compound) are disclosed in U.S. Pat. No. 4,954,199. These adhesives comprise the reaction product of a polyol, diamines and/or triamines, an isocyanate, and a low molecular weight hydroxyl group containing compound. Abrasive fillers are not present in these compositions.

Sag-resistant, adhesive compositions are also disclosed by U.S. Pat. No. 4,994,540. These compositions are prepared by mixing and reacting a curative component of a polyol and an aromatic amine terminated polyether, and a base component of an isocyanate. Fillers are not necessary in these compositions either.

U.S. Pat. No. 5,164,473 discloses low-viscosity adhesives. These consist of an isocyanate component and a curative component consisting of a polyol and/or amine terminated polyether, diamines and/or triamine, and chain extenders and/or crosslinkers. Various fillers, including glass and talc, are disclosed.

The fact that glass fillers incorporated in polymers do improve the sandability is well known. Specifically, glass microballoons disclosed in U.S. Pat. No. 5,164,473 have been widely used because other than sandability, they also exhibit the often desirable effect of lowering the density of the polymer composition. On the other hand, due to their low density, microballoons have the tendency to swim to the surface of liquid polyurethane raw materials (polyols and isocyanates) and the resulting phase separation causes processing problems.

SUMMARY OF THE INVENTION

The present invention discloses a process for repairing plastic parts with non-expanding, non-sagging polyurethane compositions that are sandable when fully cured. These compositions should also not shrink upon cure to provide a seamless uniform surface with the plastic part being repaired. Furthermore, they should be non-porous to allow application of a coating (i.e. paint) after they are sanded. In case the compositions are used to repair flexible plastic parts (i.e. RIM polyurethane bumpers), they should be at least as flexible as the substrate to avoid separation upon impact. Depending on the nature and thermal stability of the plastic parts, the compositions should develop their ultimate properties preferably at ambient temperature. These polyurethane compositions are derived from filled, phase stable polyol compositions that also contain amines and, optionally filled, phase stable polyisocyanates. Both or one of the liquid co-reactants contain glass flakes and an additional filler which has a phase stabilizing effect. After mixing the two starting materials, a non-sagging intermediate stage is formed prior to obtaining a fully reacted sandable polyurethane.

It is known that the incorporation of glass in polymers provides properties like improved dimensional stability, high modulus, and also better sandability. In polyurethane formulations, the glass can be added to the polyol or isocyanate components in the form of i.e. microballoons, fibers, or flakes. The problem, however, is that microballoons due to their low density, swim to the surface of the liquid polyurethane raw materials, and fibers and flakes sedimentate on the bottom due to their high density. In no case are phase stable glass/polyol or glass/isocyanate mixtures obtained.

It is an object of this invention to provide a process for repairing plastic parts using these phase stable, glass containing polyurethane formulations which form non-sagging, sandable polyurethane compositions. Surprisingly, it was found that the addition of certain mineral fillers, specifically talc, to glass flakes containing liquid polyurethane raw materials will provide homogenous, phase stable systems.

DESCRIPTION OF THE INVENTION

The present invention provides a process for repairing a plastic part comprising 1) mixing a polyisocyanate, an isocyanate-reactive mixture, and an inorganic filler mixture to form a non-sagging reaction mixture, 2) applying the reaction mixture to the plastic part, and 3) allowing the reaction mixture to cure. The reaction mixture forms a non-sagging polyurethane composition which is sandable once it is fully cured. This reaction mixture comprises A) a liquid polyisocyanate having an isocyanate content of from about 10 to 50% by weight, B) a liquid isocyanate-reactive mixture comprising:
  i) from 40 to 98% by weight, based on 100% by weight of component B), of one or more hydroxyl group containing compounds having from 2 to 8 hydroxyl groups and a molecular weight of from about 500 to 6000,
  ii) from 2 to 30% by weight, based on 100% by weight of component B), of one or more organic compounds containing at least one amine groups and being selected from the group consisting of diamines, polyamines, amine terminated polyethers and mixtures thereof, wherein at least one of the compounds contains at least one aromatic amine group, and
  iii) from 0 to 30% by weight, based on 100% by weight of component B), of one or more low molecular weight diols or triols having hydroxy equivalent weights of about 200 or less; and C) the inorganic filler mixture consists of
  i) from 20 to 70% by weight, based on 100% by weight of total filler, of glass flakes, and
  ii) from 30 to 80% by weight, based on 100% by weight of total filler, of another inorganic filler and being selected from the group consisting of silicate containing minerals, metal oxides, and metal salts.

Components A) and B) are present in quantities such that the isocyanate index is from 90 to 120, and component C) is present in a quantity of from 20 to 40% by weight, based on 100% by weight of components A), B) and C). Component C) is dispersed in components A) and/or B) to form a phase-stable dispersion prior to mixing components A) and B).

It is preferred that the polyisocyanate is a polymethylene poly(phenylisocyanate); component B)i) is a polyether polyol; component B)ii) contains at least one aromatic amine group and at least one aliphatic or alicyclic amine group; and component B)iii) is selected from the group consisting of 1,4-butanediol, ethylene glycol, and diethylene glycol. It is also preferred that the inorganic filler mixture consist of glass flakes and talc. Most preferably, component B)ii) comprises a mixture of an aromatic amine terminated polyether and a compound containing amine groups. The inorganic filler mixture is preferably present in the form of a phase stable dispersion of the isocyanate-reactive mixture.

Starting polyisocyanate components for use in the present invention include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate, 1,4-tetramethylene diisocyanate, 1,6-hexamethylene diisocyanate; 1,12-dodecane diisocyanate, cyclobutane-1,3-diisocyanate; cyclohexane-1,3-and-1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and, or -4,4'-diphenylmethane diisocyanate; 1,3- and 1,4-phenylene diisocyanate; 1,4- and 2,5-tolylene diisocyanate and mixtures of these isomers are also suitable in the instant invention. Diphenylmethane-2,4- and/or -4,4'-diisocyanate; naphthylene-1,5-diisocyanate; triphenyl methane-4,4'-4"-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,902, 007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Offenlegungsschriften Nos. 1,929, 034 and 2,004,408; polyisocyanates containing urethane groups of the type described, for example, in Belgian Patent No. 752,261 or in U.S. Pat. No. 3,394,164; polyisocyanates containing acylated urea groups according to German Patent No. 1,230,778 and polyisocyanates containing biuret groups of the type described, for example, in German Patent No. 1,101,394 (U.S. Pat. Nos. 3,124,605 and 3,201,372) and in British Patent No. 889,050 are also suitable.

Polyisocyanates produced by telomerization reactions of the type described, for example, in U.S. Pat. No. 3,654,106; polyisocyanates containing ester groups of the type described in, for example, British Patent Nos. 965,474 and 1,072,956, in U.S. Pat. No. 3,567,763 and in German Patent No. 1,231,688; reaction products of the above-mentioned isocyanates with acetals according to German Patent No. 1,072,385 and polyisocyanates containing polymeric fatty acid residues, according to U.S. Pat. No. 3,455,883 are still further examples of suitable isocyanates.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent No. 1,618,380 (U.S. Pat. No. 3,644,457). These may be produced for example, by reacting 1 mol of 4,4'-diisocyanato-diphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent No. 1,092,007 (U.S. Pat. No. 3,152,162). Mixtures of these preferred polyisocyanates can also be used. In general, aliphatic cycloaliphatic isocyanates are less suitable for the purposed of the instant invention.

Preferred are liquid isocyanates having isocyanate group contents of from about 10 to 50% by weight, and preferably from 15 to 35% by weight. It is generally preferred that the isocyanates used have a viscosity of less than 15,000 mPas at 25° C. It is also preferred that the isocyanate used be non-volatile at ambient temperature. Typically, useful isocyanates will have vapor pressures at 25° C. of less than 0.05 mm Hg. The presently preferred isocyanates are polymethylene poly(phenyl isocyanates) having NCO contents of from 15 to 32% by weight, and viscosities of from 40 to 3,000 mPas at 25° C., and liquid adducts of such isocyanates with polyols.

Suitable polyols for use in the polyol mixture of the present invention include those organic compounds having molecular weights of from 500 to 6000 and containing from 2 to 8 hydroxyl groups. These compounds include, for example, polyethers, polyesters, polythioethers, polyacetals, and polycarbonates of the type known for the production of polyurethanes. Preferred compounds include the polyether polyols containing from 2 to 4 isocyanate-reactive groups, and having molecular weights of from 1,000 to 4,000.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions.

Polyether polyols are preferably used as component B)i) in the invention. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and propylene oxide with greater than 5% by weight of the oxides being ethylene oxides.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be substituted, for example, by halogen atoms, and/or unsaturated. The polycarboxylic acids and polyols used to prepare the polyesters are known and described for example in U.S. Pat Nos. 4,940,750, 4,098,731 and 3,726,952, herein incorporated by reference in their entirety. The following are disclosed as suitable examples: succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrahydroisophthalic anhydride, hexahydroisophthalic anhydride, endomethylene tetrahydrophthalic anhydride, glutaric anhydride, maleic anhydride, maleic acid, fumaric acid, dimeric fatty acids such as, for example, oleic acid, and dimethyl terephthalate and mixed terephthalates. Suitable dihydric alcohols include ethylene glycol, 1,3- and 1,2-propylene glycol; 1,4-, 1,3- and 2,3-butylene glycol; 1,6-hexamethylene glycol; 1,8-octanediol; neopentyl glycol; cyclohexanedimethanol or 1,4-bis-(hydroxymethyl)-cyclohexane; 2-methyl-1,3-propanediol; 2,2,4-trimethyl-1,3-pentanediol; diethylene glycol; dipropylene glycol; triethylene glycol; tripropylene glycol; dibutylene glycol; polyethylene glycol; polypropylene glycol; and polybutylene glycol. The polyesters may also contain a portion of carboxyl end groups. Polyesters of lactones, for example, ε-caprolactone or hydroxycarboxylic acids, for example, ω-hydroxycaproic acid, may also be used.

Suitable polythioethers, polyacetals, polycarbonates and other polyhydroxyl compounds are also disclosed in the above-identified U.S. Patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Suitable amine compounds to be used as component B)ii) include, for example, organic primary and/or secondary amines selected from the group consisting of diamines, polyamines, amine terminated polyethers and mixtures thereof. The diamines have molecular weights of from 28 to about 500; the polyamines have molecular weights of from 103 to about 500; and the amine terminated polyethers have a molecular weight of from about 230 to about 5,000 and a functionality of from 2–4.

At least one of these amine group containing compounds must contain at least one aromatic amine groups. It is preferred that this component comprises a mixture of aromatic and either aliphatic amine groups or alicyclic amine groups. Most preferably, this component comprises an aromatic amine terminated polyether and a compound containing at least one alicyclic amine group. The correct choice of amine group containing compounds is important to assure homogeneity during the reaction which leads to high molecular weight polyurethanes exhibiting excellent physical properties and a good balance of hardness and elasticity. If, for example, only low molecular weight aliphatic amines are employed, the urea formed immediately upon mixing the compounds will precipitate in the liquid phase which results in an inhomogeneous polymer with inferior physical properties.

It is preferred that these amine mixtures comprise 60 to 90% by weight, based on 100% of the weight of the amine mixture, of a compound containing aromatic amine groups, and 10–40% by weight, based on 100% of the weight of the amine mixture, of a compound containing aliphatic amine groups.

Some examples of these compounds include 2-methyl-1, 5-pentane diamine, ethylene diamine, 1,3-diaminopropane, 1,4-diaminobutane, isophoronediamine, diethylenetriamine, diaminocyclohexane, hexamethylenediamine, methylimino-bispropylamine, iminobispropylamine, bis(aminopropyl)piperazine, aminoethyl piperazine, 1,2-diaminocyclohexane, bis-(p-aminocyclohexyl)methane, triethylenetetramine, tetraethylenepentamine, mixtures thereof, and the like.

Other suitable amines include, for example, 1,8-p-diaminomenthane, bis(4-aminocyclohexyl)methane, bis(4-amino-3-methylcyclohexyl)-methane, bis(4-amino-3,5-dimethylcyclohexyl)methane, bis(4-amino-2,3,5-trimethylcyclohexyl)methane, 1,1-bis(4-aminocyclohexyl)propane, 2,2-(bis(4-aminocyclohexyl)propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2bis(4-amino-3,5-dimethylcyclo-hexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

Other suitable amines to be used for component B)ii) include, for example, aromatic polyamines, including diamines, having molecular weights of less than 500. These aromatic diamines include, for example, 1-methyl-3,5-diethyl-2,4-diamino benzene, 1-methyl-3,5-diethyl-2,6-diamino benzene, 1,3,5-trimethyl-2,4-diamino benzene, 1,3, 5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines, such as, for example, mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenyl-methane-4, 4',4"-triamine. The difunctional and polyfunctional aromatic amine compounds may also exclusively or partly contain secondary amino groups such as 4,4'-di-(methylamino)-diphenylmethane or 1'methyl-2-methylamino-4-amino-benzene. Liquid mixtures of polyphenyl polymethylene-polyamines, of the type obtained by condensing aniline with formaldehyde, are also suitable.

It is also possible to use the so-called amine terminated polyethers. Among the suitable amine terminated polyethers include, for example, those containing primary or secondary (preferably primary) aromatically or aliphatically bound amino groups (preferably aromatic), wherein amino end groups can also be attached to the polyether chain through urethane or ester groups. Suitable compounds include, for example, Jeffamine D400 Jeffamine D230, Jeffamine D2000, Jeffamine D4000, Jeffamine T-403, Jeffamine T-3000, Jeffamine T-5000.

These 230 to 5,000 molecular weight amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Pat. No. 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 30% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923 4,525,534, 4,540,720, 4,578,500 and 4,565,645; European Pat. No. 097,299; and German Offenlegungsschrift 2,948,419, all the disclosures of which are herein incorporated by reference. Similar products are also described in U.S. Pat. Nos. 4,506,039, 4,525,590, 4,532,266 and 4,532,317 and in U.S. application Ser. Nos. 437,641 (filed Oct. 19, 1982), 778,656 (filed Sep. 23, 1985), 895,629 (filed Aug. 11, 1986), 908,535 (filed Sep. 16, 1986), and 916,923 (filed Oct. 9, 1986).

The amine terminated polyethers used in the present invention are in many cases mixtures with any of the above-mentioned compounds.

Suitable organic diols and triols to be used as component B)iii) according to the invention include, for example, diols and triols having a molecular weight of about 62 to 500, preferably about 62 to 400. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, and 2,2,4-trimethylpentane-1,3-diol. Preferred diols and triols include, for example, 1,4-butanediol and ethylene glycol, and diethylene glycol.

The inorganic filler mixture C) of the present invention consists of i) 20–70% by weight of glass flakes, and ii) 30 to 80% by weight of another inorganic filler. The other inorganic filler, i.e. component C)ii), is selected from the group consisting of silicate containing minerals, metal oxides, metal salts, and mixtures thereof. Some examples of suitable fillers include silicate-containing minerals, such as antigorite, serpentine, hornblends, amphibiles, chrysotile, talc, mica, and kieselguhr; metal oxides such as kaolin, aluminum oxides, titanium oxides, and iron oxides; metal salts such as chalk and heavy spar (barium sulfate). Preferred fillers are substantially inert under the conditions encountered when the components of the invention are mixed. A particularly preferred filler is talc. These various fillers may be used either individually or in admixture with each other, and must be used in combination with glass flakes.

The fillers are added to either or both of components A) and B) in quantities totaling about 20 to about 40 percent by weight based on 100% by weight of components A), B) and C). This mixture of inorganic fillers is present in the form of a phase stable dispersion in components A) and/or B) prior to mixing components A) and B).

It is also possible that the reaction mixture used in the present invention includes other auxiliary agents and additives such as, for example, plasticizers, antioxidants, colorants, pigments, catalysts, and surfactants.

Catalysts which may be used in the present invention include, for example, various organic metal compounds, including, for example, tin(II) salts of carboxylic acids, dialkyl tin salts of carboxylic acids, dialkyl tin mercaptides, dialkyl tin dithioesters and tertiary amines, such as, for example, dimethyl-cyclohexylamine (i.e. Polycat 8), pentamethyldiethylenetriamine (i.e. Polycat 5), bis[2-(dimethylamino)ethyl]ether (Niax A-1), dimethyl-ethanolamine (DMEA), Dabco WT, etc. Of course, it is also possible to use any of the catalysts which are well known to those skilled in the art of polyurethane chemistry. It is preferred to use tertiary amines as the catalysts in the present invention.

Surface-active additives such as emulsifiers are also included in the reaction mixture of the present invention. Some suitable surface-active additives include compounds such as, for example, N-stearyl-N',N'-bis-hydroxyethyl urea, oleyl polyoxyethylene amide, stearyl diethanol amide, isostearyl diethanol-amide, polyoxy-ethylene glycol monoleate, a pentaerythritol/adipic acid/oleic acid ester, a hydroxy ethyl imidazole derivative of oleic acid, N-stearyl propylene diamine and the sodium salt of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

In addition to the catalysts, surface-active agents, and fillers and reinforcing agents, other additives which may be used in preparing compositions of the present invention include flame retarding agents, plasticizers, dyes, internal mold release agents, etc.

The compositions according to the present invention are preferably used at isocyanate indexes ranging from about 90 to 120, preferably from 98 to 110. By the term "Isocyanate Index" (also commonly referred to as NCO index), is defined herein as the equivalents of isocyanate, divided by the total equivalents of isocyanate-reactive hydrogen containing materials, multiplied by 100.

The additives can be incorporated in either the isocyanate or the isocyanate-reactive mixture prior to mixing the two components. Preferably they are added to the isocyanate-reactive mixture to avoid any negative effect which they may have on the stability of the isocyanate component.

As used herein, the phrase molecular weight refers to number average molecular weight.

Prior to mixing the isocyanate with the isocyanate-reactive mixture, the inorganic filler mixture should be mixed with the isocyanate component and/or the isocyanate-reactive mixture to form a phase stable dispersion. All of the inorganic filler mixture may be added to either of these components, or part of the filler mixture may be added to each component.

Once this phase stable dispersion is formed, the remaining components are mixed to form the reaction mixture. The components may be mixed in any way, e.g., by stirring them together, by combining them in a mixhead, or the like. In field repairs, however, it is possible to store the materials using a cartridge with a membrane separating the two components and a plunger to break the membrane for the application of the compositions. Another simple method is to store premeasured amounts of the reactants in plastic bags and, when ready to use, to combine them in a plastic bag and mix by kneading the bag. After mixing is complete, the material can be applied by squeezing it out of a hole made by cutting off a corner of the plastic bag.

Another way of using the composition is to store the materials in cartridges and apply the mixture using a two component caulking gun. The mixing in this case is achieved by a static mixer located in the tip of the caulking gun. In this case, the preferred volume ratio of isocyanate reactive mixture to isocyanate is 1:1 (see Example 13).

Once the polyurethane compositions are mixed, the non-sagging compositions have a working time of about 2 to 30 minutes, preferably about 2 to 10 minutes during which the compositions may be applied to the object which is to be repaired. Once the compositions are applied to the object being repaired, final cure of these non-sagging polyurethane compositions occurs in about 2 to 24 hours at ambient temperature, preferably about 2 to 6 hours at ambient temperature.

Suitable plastic parts for repair in the process of the invention include, for example, vehicle bumpers, automotive body panels, automotive fascias, automotive grilles, automotive spoilers, automotive moldings, automotive exterior trim, computer housings, plastic window frames, composite skis, golf carts, satellite dishes, plastic toys, etc. The repair can be done on imperfect parts in an OEM operation or upon damage occurring when the part is in use. The compositions of the present invention are of specific interest for automotive repair shops because it allows repairs of a wide variety of plastics used on the exterior of cars. After repair, these parts can be sanded and refinished (repainted).

The invention is further illustrated but is not intended to be limited by the following examples in which all parts and percentages are by weight unless otherwise specified.

EXAMPLES

Examples 1–5

The following examples demonstrate sandability (Taber Abrasion), depending on various ratios of glass flakes and talc.

The test samples were prepared by mixing the filler containing isocyanate and polyol components by kneading in a plastic bag, to prevent any air to be mixed in the composition which could result in an undesirable porous material.

After mixing for about 2 minutes, a corner of the plastic bag was cut-off and the non-sagging polyurethane composition was squeezed onto a 4"×4" metal test panel with a center hole (i.e. a typical Taber-abrasion test panel). Using a draw-down bar the polyurethane composition was spread to an even thickness of about 20 mil. Subsequently, the coated panels were cured in an oven at 80° C. for 15 minutes.

The test panels were tested for Taber abrasion according to ASTM D 4060-90.

Examples 1–5 were performed using the following components in the following formulation:

Polyol A: a poly(propylene oxide)triol capped with ethylene oxide (equivalent weight 2000)

Amine A: an amine-terminated polyether (prepared by reacting a polyoxypropylene polyoxyethylene triol having an equivalent weight of 1600 with an excess of toluene diisocyanate to form an isocyanate-terminated prepolymer and hydrolyzing this material to form the amine-terminated polyether)

1,4-XB: 1,4-butanediol

TMP: trimethylol propane

PACM-20: bis-(4-amino-cyclohexyl)methane

Baylith L Paste: 50% sodium potassium alumino silicate in castor oil

Catalyst A: 10% of dimethyl tin dilaurate dissolved in a poly(propylene oxide)triol capped with ethylene oxide (equivalent weight 1600)

Isocyanate A: a urethane-modified polyisocyanate was prepared by reacting 3756.4 parts of a polymethylene poly(phenyl isocyanate) (having a 2,4'isomer content of about 19%) and an NCO functionality of about 2.4, with 724.4 parts of a poly(propylene oxide)triol capped with ethylene oxide (equivalent weight 2000). The resultant modified polyisocyanate had an NCO content of 26.4% (theoretical % NCO=27.0) and a viscosity of 292.5 MPa.s.

Filler A: glass flakes having a diameter of 1/64"

Filler B: mistron vapor (talc)

| POLYOL BLEND A: | PARTS BY WEIGHT |
|---|---|
| Polyol A | 71.5 |
| Amine A | 14.7 |
| 1,4-XB | 17.5 |
| PACM-20 | 3.5 |
| Baylith L Paste | 13.3 |
| Catalyst A | 0.21 |

Example 1

20% total filler: 50/50 glass flakes/talc.

12.5 g glass flakes and 12.5 g talc were added to 100 g of Polyol Blend A.

10.9 g glass flakes and 10.9 g talc were added to 87.4 g of Isocyanate A.

These two mixtures were blended in a 12.5/10.92 polyol/isocyanate ratio.

Example 2

30% total filler: 50/50 glass flakes/talc.

21.5 g glass flakes and 21.5 g talc were added to 100 g of Polyol Blend A.

18.75 g glass flakes and 18.75 g talc were added to 87.4 g of Isocyanate A.

These two mixtures were blended in a 14.3/12.5 polyol/isocyanate ratio.

Example 3

40% total filler: 50/50 glass flakes/talc.

33.3 g glass flakes and 33.3 g talc were added to 100 g of Polyol Blend A.

29.1 g glass flakes and 29.1 g talc were added to 87.4 g of Isocyanate A.

These two mixtures were blended in a 16.66/14.55 polyol/isocyanate ratio.

Example 4

40% total filler: 20/80 glass flakes/talc.

13.32 g glass flakes and 53.28 g talc were added to 100 g of Polyol Blend A.

11.64 g glass flakes and 46.56 g talc were added to 100 g of Isocyanate A.

These two mixtures were blended in a 16.66/14.55 polyol/isocyanate ratio.

Example 5

40% total filler: 70/30 glass flakes/talc.

46.62 g glass flakes and 19.98 g talc were added to 100 g of Polyol Blend A.

40.74 g glass flakes and 17.46 g talc were added to 87.4 g of Isocyanate A.

These two mixtures were blended in a 16.66/14.55 polyol/isocyanate ratio.

Results of the five experiments are summarized in the table below.

| EXAMPLE | FILLER | TABER ABRASION (mg)* |
|---|---|---|
| 1 | 20% total filler 50/50 glass/talc | 130.6 |
| 2 | 30% total filler 50/50 glass/talc | 119.3 |
| 3 | 40% total filler 50/50 glass/talc | 179.5 |
| 4 | 40% total filler 20/80 glass/talc | 134.0 |
| 5 | 40% total filler 70/30 glass/talc | 156.1 |

*H-18 wheel-100 revolutions with 1000 gm weight on each wheel. (Test according to ASTM-D3489)

The experiments indicate that higher glass levels generally lead to higher abrasion and thus improved sandability. Limitations are, however, the increasing viscosity at high overall filler levels and the necessity to use a certain amount of talc to keep the dispersed glass flakes from sedimentation. All the samples were not

13 uniform in thickness and surface smoothness. This would explain i.e the discrepancy seen between the values in Examples 1 and 2.

Examples 6–12 were conducted in order to assess the effect on sandability and dispersion stability using various ratios of glass flakes and talc as fillers. Mixing of the components and preparation of the panels for the Taber abrasion test was done according to Examples 1–5 as set forth hereinabove. These examples used the same components as Examples 1–5 except that the following components were also used in these formulations:

Catalyst B: 10% solution of di-n-butyl tin dilaurate in a poly(propylene oxide)triol capped with ethylene oxide (equivalent weight 2000)

POLYOL BLEND B:

The polyol blend in examples 6–12 was prepared from 572.0 parts of Polyol A, 117.6 parts of Amine A, 100.0 parts of TMP, 100.0 parts of 1,4-XB, 28.0 parts of bis-(4-aminocyclohexyl)methane, 106.4 parts of sodium potassium aluminosilicate in castor oil, and 1.76 parts of a 10% solution of di-η-butyl tin dilaurate in a poly(propylene oxide)triol capped with ethylene oxide (equivalent weight 2000).

Examples 6–12

Example 6

20% total filler: 50/50 talc/glass flakes.

12.5 g talc (Mistron Vapor, Cyprus) and 12.5 g glass flakes (1/64") were added to 100 g of Polyol Blend B. This mixture was blended to give a smooth phase stable dispersion. 10.9 g talc and 10.9 g glass flakes were added to 87.4 g of Isocyanate A. This mixture was blended to give a smooth phase stable dispersion.

These two mixtures were blended in a 10/18.74 polyol/isocyanate ratio.

Example 7

20% total filler: talc only.

Same formulation as in 6, but using 20% by weight of talc in both the Polyol Blend B and the Isocyanate A.

Example 8

20% total filler: glass flakes only.

Same formulation as in 6, but using 20% by weight of glass flakes in both the Polyol Blend B and the Isocyanate A.

Example 9

40% total filler: 20/80 glass flakes/talc.

Same formulation as in 6, but using a 40% total filler content comprised of 20% glass flakes and 80% talc in both Polyol Blend B and Isocyanate A.

Example 10

40% total filler: 70/30 glass flakes/talc.

Same formulation as in 6, but using a 40% total filler content comprised of 70% glass flakes and 30% talc in both Polyol Blend B and Isocyanate A.

14

Example 11

40% total filler: glass flakes only.

Same formulation as in 6, but using 40% by weight of glass flakes in both Polyol Blend B and Isocyanate A.

Example 12

40% total filler: talc only.

Same formulation as in 6, but using 40% by weight of talc powder in both Polyol Blend B and Isocyanate A.

All of the above formulations were evaluated for sandability using the Taber Abrasion Test and also for dispersion stability. The results are summarized in the table below.

| EXAMPLE | FILLER | TABER ABRASION (mg)* | DISPERSION STABILITY** |
|---------|--------|---------------------|------------------------|
| 6 | 20% total filler 50/50 glass/talc | 30 | good |
| 7 | 20% talc | 29 | good |
| 8 | 20% glass | 43 | bad |
| 9 | 40% total filler 20/80 glass/talc | 87 | good |
| 10 | 40% total filler 70/30 glass/talc | 57[1] | good |
| 11 | 40% glass | 121 | bad |
| 12 | 40% talc | *** | good |

*1000 revolutions using CS 17 wheel with 1000 g weight on each wheel.
**Descriptions refer to short-term (2 to 3 days) stability.
***Formulation not used due to extremely high viscosity.
[1]Very irregular surface, probably due to the high glass content, Taber abrasion value not representative because the wheel did not touch the total surface.

Experiments 6–12 demonstrate that glass flakes result in excellent sandability (as measured using Taber Abrasion). However, when used as the only filler, the dispersion stability is poor. A combination of glass flakes and talc results in improved dispersion stability and good sandability.

Example 13

Another example of a formulation according to the invention is given below. This formulation provides not only good sandability and short cure time, but allows mixing of the components at a 1:1 volume ratio. This enables the applicator to use commercially available two-component caulking guns where the mixing is achieved using a static mixer in the caulking gun dispensing nozzle (or tip). The following components were used in this example.

Isocyanate B: a urethane-modified polyisocyanate was prepared by blending 27.4 parts of a poly(phenylmethylene isocyanate) (having a 2,4'isomer content of about 22% and NCO functionality of 33%), with 41.0 parts of a prepolymer having an NCO content of 8.0% that was prepared by reacting a mixture of 4,4'methylene diphenyl diisocyanate and 2,4'methylene diphenyl diisocyanate (at a weight ratio of 70:30) with a propylene glycol-initiated propylene oxide ethylene oxide polyether polyol having an OH number of 28 and an average molecular weight of 4000. To this mixture, 15.8 parts talc (Mistron Vapor, Cyprus) and glass flakes (1/64") (32% total filler content) were added.

Polyol B: a poly(propylene oxide)triol, having an equivalent weight of 152

Amine B: an amine-terminated polyether (prepared by reacting a polyoxypropylene polyoxyethylene triol having an equivalent weight of 1600 with an excess of toluene diisocyanate to form an isocyanate-terminated prepolymer and hydrolyzing this material to form the corresponding amine-terminated polyether)

Polyol C: a poly(propylene oxide)diol

TMP: trimethylol propane

PACM -20: bis(4-aminocyclohexyl) methane

Baylith L Paste: 50% sodium potassium alumino silicate in castor oil

Filler A: glass flakes (diameter of 1/64")

Filler B: talc (Mistron Vapor, Cyprus)

Catalyst C 1:1 mixture of DABCO 33LV (an amine-based catalyst, commercially available from Air Products & Chemicals Inc.), and Topcat 190 (a tin-based catalyst, commercially available from Tylo)

POLYOL BLEND C:

A polyol blend was prepared by mixing 24.0 parts of Polyol B, 12.0 parts of Polyol C, 12.0 parts of castor oil, 1.6 parts TMP, 3.6 parts PACM-20, 18.0 parts of Amine B, 4.8 parts of Baylith L Paste, 12.0 Filler A, 12.0 parts Filler B, and 0.3 parts of Catalyst C.

150 ml of Isocyanate B was placed in one cartridge of a two-component caulking gun, and 150 ml of Polyol Blend C was placed in the second cartridge of the two-component caulking gun. The caulking gun was equipped with a static mixer in the tip to mix the isocyanate with the polyol blend prior to the mixture exiting the tip of the gun. Using this caulking gun, the components were mixed in a 1:1 volume ratio and applied to a polyurethane RIM bumper which had a surface imperfection (a hole caused by an air bubble entrapped in the RIM bumper production tool).

The non-sagging polyurethane was pushed in the hole and smoothened out using a spatula. The formulation provided excellent adhesion and cured at ambient temperature in 4 hours to form a flexible, sandable polyurethane with a Shore hardness of 93A. To achieve a completely smooth surface, a disc sander with a 250 grit sandpaper was used. After patching and sanding, the RIM bumper was ready to be painted.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of repairing a plastic part comprising:
   1) mixing
      A) a liquid polyisocyanate having an isocyanate content of from about 10 to 50% by weight,
      B) a liquid isocyanate-reactive mixture comprising:
         i) from 40 to 98% by weight, based on 100% by weight of component B), of one or more hydroxyl group containing compounds having from 2 to 8 hydroxyl groups and molecular weight of from about 500 to 6000,
         ii) from 2 to 30% by weight, based on 100% by weight of component B), of one or more organic compounds containing at least one amine group and being selected from the group consisting of diamines, polyamines, amine terminated polyethers and mixtures thereof, wherein at least one of said compounds contains at least one aromatic amine group, and
         iii) from 0 to 30% by weight, based on 100% by weight of component B), of one or more low molecular weight diols or triols having hydroxy equivalent weights of about 200 or less; and
      C) from 20 to 40% by weight, based on 100% by weight of components A), B) and C), of an inorganic filler mixture consisting of:
         i) from 20 to 70% by weight, based on 100% by weight of total filler, of glass flakes, and
         ii) from 30 to 80% by weight, based on 100% by weight of total filler, of talc;
      to form a non-sagging reaction mixture wherein component C) is dispersed in components A) and/or B) to form a phase-stable dispersion prior to mixing components A) and B), and components A) and B) are present in quantities such that the isocyanate index of the resultant polyurethane composition is from 90 to 120;
   2) applying said non-sagging reaction mixture to said plastic part, and
   3) allowing said non-sagging reaction mixture to cure, thereby forming a sandable polyurethane composition.

2. The process of clam 1, wherein said organic compound B)ii) comprises a mixture of a) at least one compound containing at least one aromatic amine group and b) at least one compound containing at least one aliphatic amine group or at least one alicyclic amine group.

3. The process of claim 2, wherein said organic compound B)ii) comprises a mixture of a) an aromatic amine terminated polyether and b) a compound containing alicyclic amine groups.

4. The process of claim 1, wherein said liquid polyisocyanate is polymethylene poly(phenylisocyanate).

5. The process of claim 1, wherein said hydroxy group containing compound is a polyether.

6. The process of claim 1, wherein said liquid isocyanate-reactive mixture comprises from 50–70% by weight of one or more hydroxy group containing compounds, from 10–25% by weight of one or more organic compounds containing amine groups, and from 5 to 15% by weight of one more low molecular weight diols or triols.

7. The process of claim 6, wherein said organic compound B)ii) comprises a mixture of a) an aromatic amine terminated polyether and b) a compound containing alicyclic amine groups.

* * * * *